(12) United States Patent
Kohli

(10) Patent No.: US 10,891,617 B2
(45) Date of Patent: Jan. 12, 2021

(54) SYSTEMS AND METHODS FOR BIOMETRIC IDENTITY AUTHENTICATION

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 642 days.

(21) Appl. No.: 15/281,413

(22) Filed: Sep. 30, 2016

(65) Prior Publication Data

US 2018/0096354 A1 Apr. 5, 2018

(51) Int. Cl.
*G06Q 40/00* (2012.01)
*G06Q 20/40* (2012.01)
(Continued)

(52) U.S. Cl.
CPC ....... *G06Q 20/40145* (2013.01); *G06F 21/32* (2013.01); *H04L 63/0861* (2013.01); *H04L 2463/102* (2013.01)

(58) Field of Classification Search
CPC .......................... G06Q 20/40145; G06F 21/32
See application file for complete search history.

(56) References Cited

U.S. PATENT DOCUMENTS 8,494,962 B2 7/2013 Bacastow et al.
8,504,450 B2 8/2013 Shastry et al.
(Continued)

FOREIGN PATENT DOCUMENTS

IN 278915 * 1/2017 ............ G06Q 50/00
WO 2000067177 A2 11/2000
(Continued)

OTHER PUBLICATIONS

Anonymous, "Device Authentication by Continuous or Repeated Ambient Biometric Data Collection," IP.com No. IPCOM000246655D (Year: 2016).*
(Continued)

*Primary Examiner* — Alexander G Kalinowski
*Assistant Examiner* — William B. Bunker
(74) *Attorney, Agent, or Firm* — Armstrong Teasdale LLP

(57) ABSTRACT

A method for authenticating a user identity for a data transaction is provided. The method is implemented using an identity authentication computing device in connection with a memory and a data transaction processor. The method includes receiving a request from a first user of a first client device for a data transaction with a second user, causing a second client device to prompt the second user for biometric identification information, receiving captured biometric identification information corresponding to the second user, retrieving sample biometric identification information associated with the second user, comparing the captured biometric information and the sample biometric information, determining that the captured and the sample biometric information match, completing a data transaction between the first user and the second user, and transmitting an instruction to one or more of the first client device and the second client device displaying a notification that the data transaction is completed.

17 Claims, 7 Drawing Sheets

(51) Int. Cl.
 *G06F 21/32* (2013.01)
 *H04L 29/06* (2006.01)

(56) References Cited

U.S. PATENT DOCUMENTS

| | | | | |
|---|---|---|---|---|
| 8,554,685 | B2* | 10/2013 | Patterson | G06Q 20/40145 |
| | | | | 705/52 |
| 9,165,291 | B1* | 10/2015 | Andersen | G06Q 20/10 |
| 9,294,476 | B1* | 3/2016 | Lurey | H04W 12/06 |
| 2004/0044621 | A1* | 3/2004 | Huang | G06Q 20/02 |
| | | | | 705/40 |
| 2007/0040017 | A1* | 2/2007 | Kozlay | H04L 9/3234 |
| | | | | 235/380 |
| 2007/0255662 | A1* | 11/2007 | Tumminaro | G06Q 20/027 |
| | | | | 705/79 |
| 2008/0126145 | A1* | 5/2008 | Rackley, III | G06Q 20/102 |
| | | | | 455/406 |
| 2010/0044430 | A1 | 2/2010 | Song et al. | |
| 2010/0332308 | A1* | 12/2010 | Yap | G06O 50/26 |
| | | | | 705/14.34 |
| 2011/0035319 | A1* | 2/2011 | Brand | G06Q 20/10 |
| | | | | 705/44 |
| 2011/0204142 | A1* | 8/2011 | Rao | G06Q 10/06 |
| | | | | 235/380 |
| 2013/0024262 | A1* | 1/2013 | Libenson | G06Q 30/02 |
| | | | | 705/14.25 |
| 2013/0067546 | A1 | 3/2013 | Thavasi et al. | |
| 2013/0307670 | A1* | 11/2013 | Ramaci | G06Q 10/10 |
| | | | | 340/5.82 |
| 2014/0196118 | A1* | 7/2014 | Weiss | H04L 63/0846 |
| | | | | 726/4 |
| 2014/0258123 | A1* | 9/2014 | Fernandes | G06Q 20/401 |
| | | | | 705/44 |
| 2014/0279497 | A1* | 9/2014 | Qaim-Maqami | G06Q 20/3821 |
| | | | | 705/44 |
| 2014/0297530 | A1 | 10/2014 | Eckel et al. | |
| 2014/0310171 | A1* | 10/2014 | Grossman | G06Q 20/385 |
| | | | | 705/44 |
| 2015/0015365 | A1 | 1/2015 | Ortiz et al. | |
| 2015/0341350 | A1* | 11/2015 | Mandal | H04L 63/0861 |
| | | | | 726/6 |
| 2016/0071109 | A1* | 3/2016 | Lazay | G06Q 20/40145 |
| | | | | 705/44 |
| 2016/0335511 | A1* | 11/2016 | MacDonald | G06K 9/00335 |
| 2017/0094510 | A1* | 3/2017 | Khosravi | H04W 12/06 |
| 2017/0270516 | A1* | 9/2017 | Jeong | H04L 63/0861 |
| 2018/0130058 | A1* | 5/2018 | Song | G06F 21/33 |
| 2019/0188677 | A1* | 6/2019 | Arthur | G06Q 20/322 |

FOREIGN PATENT DOCUMENTS

| | | | | |
|---|---|---|---|---|
| WO | WO-2008027247 | A2* | 3/2008 | G06F 21/6254 |
| WO | WO-2008027621 | A1* | 3/2008 | G06Q 20/3221 |
| WO | WO-2009114876 | A2* | 9/2009 | G06Q 20/10 |
| WO | WO-2015062412 | A1* | 5/2015 | G06Q 20/02 |
| WO | WO-2017193645 | A1* | 11/2017 | G06F 21/32 |

OTHER PUBLICATIONS

Shiny Sreekumar, "Biometric Authentication in Mobile Payments," Masters Thesis, Information Management Faculty of Computer Sciences, University of Kolenz-Landau (Year: 2010).*

PCT International Search Report and Written Opinion, Application No. PCT/US2017/045889, dated Oct. 11, 2017, 12 pgs.

* cited by examiner

SYSTEMS AND METHODS FOR BIOMETRIC IDENTITY AUTHENTICATION

BACKGROUND OF THE DISCLOSURE

The field of the disclosure relates to authenticating the identity of a user of a computing device based on biometric identification information maintained by an entity.

Users of computing devices increasingly are concerned with security of communications with other users and entities. These users seek to prevent sending information to unauthorized parties and parties whose identity is unknown or fraudulent. For example, users employ systems that require authentication of user identity before communicating with other users. This increases the likelihood that a user is communicating with an intended party and reduces the risk of communicating with unintended or fraudulent parties. These systems may use techniques such as multifactor authentication to attempt to prevent unauthorized or fraudulent users of the communication system. However, such authentication systems typically require several inputs from users to provide identity authentication such as answering multiple challenge questions, providing a password, entering a code received from a separate service or device, etc. As a result, the authentication process provided by typical systems is overly time consuming and cumbersome for some users. Furthermore, typical systems that may employ multifactor authentication may not provide strong authentication and may be susceptible to fraud and unauthorized use.

It would be beneficial to provide strong authentication of users for communication between users. It would further be beneficial to provide authentication using identification information for users and potential users of a communication system.

BRIEF DESCRIPTION OF THE DISCLOSURE

In one aspect, a method of authenticating a user identity for a data transaction is provided. The method is implemented using an identity authentication computing device in connection with a memory and a data transaction processor. The method includes receiving, by the identity authentication computing device and from a first client device, a request from a first user for a data transaction with a second user, and transmitting, by the identity authentication computing device and to a second client device associated with the second user, instructions formatted to cause the second client device to prompt the second user for biometric identification information. The method further includes receiving, by the identity authentication computing device and from the second client device, captured biometric identification information corresponding to the second user, and making a call, by the identity authentication computing device, to a database of sample biometric identification information in network communication with the identity authentication computing device, and retrieving sample biometric identification information associated with the second user, the sample biometric identification information being previously provided by the second user. The method further includes comparing the captured biometric information and the sample biometric information, determining that the captured biometric information and the sample biometric information match to a degree above a predetermined threshold, transmitting, in response to the determining step and by the identity authentication computing device, an instruction to the data transaction processor to complete a data transaction between the first user and the second user, and transmitting, by the identity authentication computing device, an instruction to one or more of the first client device and the second client device formatted to cause a notification to be displayed that indicates the data transaction has been completed.

In another aspect, an identity authentication computing device includes at least one processor in communication with a memory. The identity authentication computing device is in communication with at least a first client device and a second client device. The at least one processor is programmed to receive, from the first client device, a request from a first user for a data transaction with a second user, transmit, to the second client device associated with the second user, instructions formatted to cause the second client device to prompt the second user for biometric identification information, receive, from the second client device, captured biometric identification information corresponding to the second user, generate a call to a database of sample biometric identification information in network communication, and retrieve sample biometric identification information associated with the second user, compare the captured biometric information and the sample biometric information, determine that the captured biometric information and the sample biometric information match to a degree above a predetermined threshold and in response: transmit an instruction to a data transaction processor to complete a data transaction between the first client device and the second client device, and transmit an instruction to one or more of the first client device and the second client device formatted to cause a notification to be displayed that indicates the data transaction has been completed.

In a further aspect, a computer-readable storage media having computer-executable instructions embodied thereon is provided. Wherein when executed by an identity authentication computing device including at least one processor in communication with a memory, the computer-executable instructions cause the identity authentication computing device to receive, from a first client device, a request from a first user for a data transaction with a second user, transmit, to a second client device associated with the second user, instructions formatted to cause the second client device to prompt the second user for biometric identification information, receive, from the second client device, captured biometric identification information corresponding to the second user, make a call to a database of sample biometric identification information in network communication, and retrieve sample biometric identification information associated with the second user, compare the captured biometric information and the sample biometric information, determine that the captured biometric information and the sample biometric information match to a degree above a predetermined threshold, transmit an instruction to a data transaction processor to complete a data transaction between the first client device and the second client device, and transmit an instruction to one or more of the first client device and the second client device formatted to cause a notification to be displayed that indicates the data transaction has been completed.

BRIEF DESCRIPTION OF THE DRAWINGS

FIGS. 1-6 show example embodiments of the methods and systems described herein.

FIG. 1 is a schematic diagram illustrating an example identity authentication computing device for authenticating a user using biometrics in communication with a multi-party payment card system in accordance with one embodiment of the present disclosure.

FIG. 2 is an expanded block diagram of an example computer system used in authenticating user identities and processing payment transactions that includes the identity authentication computing device of FIG. 1.

FIG. 3 illustrates an example configuration of a server system such as the identity authentication computing device of FIG. 2.

FIG. 4 illustrates an example configuration of a client system shown in FIG. 2.

FIG. 6 is a diagram of components of one or more example computing devices that may be used in the environment shown in FIG. 2.

Figure 1:
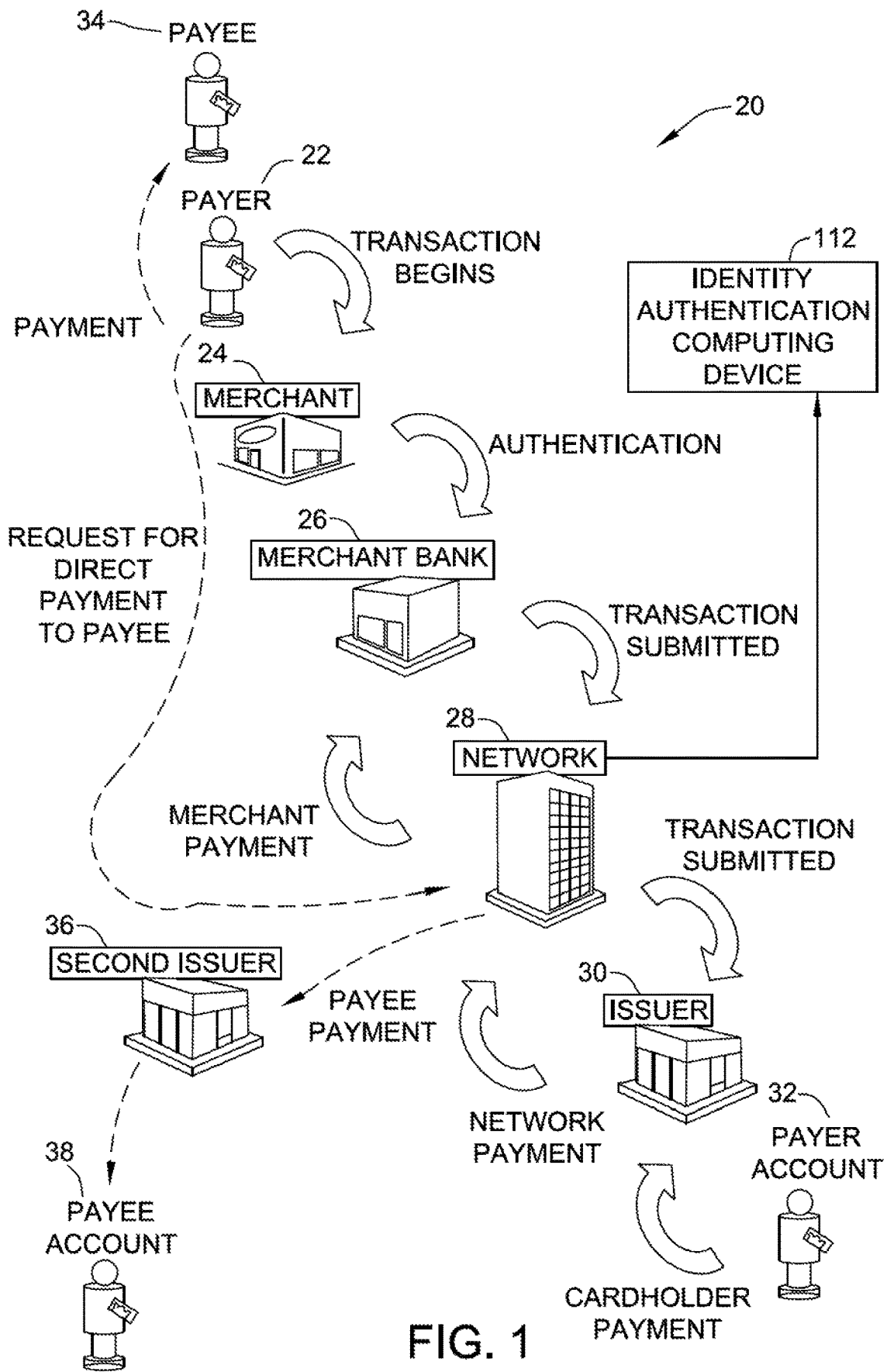

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein facilitate the authentication of a user identity for performing a transaction between two users. The system described herein (i) receives, from a first client device, a request from a first user for a data transaction with a second user; (ii) transmits, to a second client device associated with the second user, instructions formatted to cause the second client device to prompt the second user for biometric identification information; (iii) receives, from the second client device, captured biometric identification information corresponding to the second user; (iv) makes a call to a database of sample biometric identification information and retrieves sample biometric identification associated with the second user; (v) compares the captured biometric information and the sample biometric information; (vi) determines that the captured biometric information and the sample biometric information match to a degree above a predetermined threshold; (vii) transmits, in response to the determination, an instruction to a data transaction processor to complete a data transaction between the first user and the second user; and (viii) transmits, in response to the determination, an instruction to one or more of the first client device and the second client device formatted to cause a notification to be displayed that indicates the data transaction has been completed.

To address the deficiencies of typical authentication systems, an identity authorization computing device ("IA computing device"), according to the example systems and methods described below, provides strong authentication of users for communication between users and/or other parties. The strong authentication is superior in comparison to token-based identification systems (e.g., an identification card such as a driver's license or passport) and knowledge-based identification systems (e.g., a password or challenge questions) of typical authentication systems because strong authentication uses biometric information that is unique to each person.

The IA computing device is in communication with an identification database that includes biometric identification information for potential users for use in strong authentication. In one embodiment, the identification database is a national ID database maintained by a government. The identification database stores identifying information such as name, address, national ID number, age, gender, mobile phone number, biometric identification information (e.g., fingerprints, palm vein pattern, facial recognition pattern, iris pattern, retina pattern, or other human characteristic unique to individuals), or other information. In some embodiments, the identification database includes behavioral biometric information such as a voice pattern, typing rhythm, or other behavioral characteristic unique to individuals.

In an alternative embodiment, the identification database is maintained by a non-governmental entity. For example, the identification database is maintained by an issuing bank (e.g., a bank that issues payment cards such as a credit card, debit card, or a prepaid card), the identification database is a distributed databased maintained by more than one issuing bank, or the identification database is maintained by a payment processing network configured to process payment card transactions initiated by cardholders of payment cards.

In still further embodiments, the identification database is a database configured to store information used by the IA computing device. In alternative embodiments, the identification information is a biometric profile of a user stored in the user's device that is enrolled with the IA computing device.

In some embodiments, the IA computing device uses one or more of the identification databases described herein. For example, the IA computing device may initially make a call to an identification database maintained by an issuing bank. If that call is unsuccessful, the IA computing device may then make a call to the national ID database maintained by the government.

The IA computing device uses the identification information to authentic users. The IA computing device is configured to receive captured identification information through network communication with a user computing device and/or an intermediate device(s) (e.g., a payment processing network). Captured identification information is captured by a client device such as a mobile computing device (e.g., a smartphone), other computing device, or identification information capturing device in communication with the computing device. For example, a smartphone, using an application running thereon, captures a fingerprint through a fingerprint reader included in the smartphone. The smartphone transmits the captured identification information to the IA computing device.

The IA computing device is configured to authenticate a user's identity using the received captured identification information. The IA computing device compares the captured identification information to sample identification information in an identification database and authenticates the user's identity if the captured identification information and the sample identification information match. For example, the IA computing device receives a request for authentication including captured identification information and a corresponding user name. The IA computing device uses the user name to query the identification database for corresponding sample identification information. The IA computing device compares the captured identification information to the sample identification information.

For example, the IA computing device compares captured identification information including a fingerprint to the sample identification information that includes a reference fingerprint provided by a national ID database. The IA computing device uses one or more fingerprint matching algorithms to compare the pattered fingerprint to the sample fingerprint. For example, the IA computing device uses pattern-based algorithms or other image processing algorithms to compare an image associated with the captured fingerprint and an image associated with the sample fingerprint. The IA commuting device aligns the captured fingerprint with the sample fingerprint based on a central point in the one or more of the fingerprints. The IA computing device compares one or more of the type, size, and orientation of one or more of arches, whorls, and loops in the captured fingerprint to those of the sample fingerprint to determine the degree to which the captured fingerprint matches the sample fingerprint. If the degree of match is above a predetermined threshold, the IA computing device determines that the captured fingerprint matches the sample fingerprint.

In alternative embodiments, the IA computing device transmits the captured identification information to the identification database along with a request for validation. The identification database compares the captured identification information to sample identification information and returns to the IA computing device an indication that the captured identification information and the sample identification information match or do not match. The underlying repository managing the biometric records of the user validates the biometric credential of the user when received in correspondence to a transaction. In various embodiments, this is implemented in the form of a biometric device on a client system performing the validation on its side, and if the biometric records are stored on a server (e.g., the IA computing device, a third party database, etc.) then the client system can capture the biometric credential and share a computed hash value (through the use of a hashing function) to a server of the identification database and the server performs a corresponding computation on its side to see if the hash values match.

The IA computing device authenticates that the user information associated with the captured identification information matches the sample identification information stored in the identification database. The IA computing device transmits an authentication message or other command in response to authenticating a user's identity.

In some embodiments, the IA computing device is in communication with a payment processing network. The IA computing device authenticates users of the payment processing network and in response to authenticating a user causes a payment to be processed by the payment processing network. The payment processing network is in electronic network communication with an issuer bank that maintains an account for and issues a payment card to a payer. The payment processing network is further in communication with a merchant bank that is in further communication with a merchant that receives payment by payment cards. Additionally, the payment processing network can be in communication with a payee bank that maintains an account for the payee. The IA computing device facilitates processing of payments and/or transfers of funds between entities in communication with the payment processing network.

In one embodiment, the IA computing device, in coordination with the payment processing network, facilitates payments from a payer with an account at a first issuer (e.g., a bank, telephone service provider, internet service provider, or other institution) to a payee with an account at a second issuer. To make a payment to the payee, the payer registers the payee with a remittance service provider (e.g., the payment processing network and/or IA computing device) using the payee's identification information (e.g., one or more of the payee's national ID and mobile telephone number, etc.). For example, the payer enters the payee's identification information using a graphical user interface of an application running on a client device such as a mobile phone. The payer's client device transmits the information to the IA computing device, and the IA computing device generates a unique registration code for use by the payee to register with the remittance service provider.

The IA computing device transmits the unique registration code to a client device associated with the payee. For example, the IA computing device transmits a push notification to an application running on the payee's client device. The IA computing device addresses the notification to the payee using the identification information received from the payer (e.g., a telephone number). Alternatively, the IA computing device transmits information (e.g., a hyperlink) to the payee's client device that directs the payee to a website or other location where the application can be downloaded. The payee can then download and install the application on the payee's client device. For example, the IA computing device transmits a hyperlink to download the application by sending a Short Message Service (SMS) message to the payee's telephone number.

Upon running the application on the payee's client device, the application will prompt the payee to enter the unique registration code generated by the IA computing device based on the information received from the payer to register the payee. The payee enters the unique registration code, and the application prompts the payee to provide identification information. For example, the application prompts the payee to provide a fingerprint using a fingerprint reader or other device included in or in communication with the payee's client device. In some embodiments, the payee's client device includes a fingerprint reader. The application prompts the payee to place their finger on the fingerprint reader and controls the fingerprint reader to capture the fingerprint (e.g., generate and store an image of the payee's fingerprint using the fingerprint reader). This allows the payee to register their fingerprint with the remittance service provider. As part of the enrollment process, the application prompts the payee to provide account information for an account with an issuer to which received payments will be paid and from which payments to other users are paid. For example, the payee provides an account number, mobile wallet identification information, and/or other information. Received payments can be deposited in a bank account, credited to a pre-paid account, applied to a telephone service provider or internet service provider, applied to a mobile wallet, etc. As described later herein, the payment processing network processes the payment as directed by the IA computing device and after the IA computing device authenticates the payee.

Upon receiving the captured identification information, the application running on the payee's client device transmits the captured identification information to the IA computing device for authentication. The IA computing device authenticates the identity of the payee using the captured identification information as described above. For example, the IA computing device makes a call to an identification database (e.g., a national ID database) to retrieve sample identification information (e.g., a sample fingerprint image) corresponding to the payee. In some embodiments, the call is a web service call. The IA computing device compares the retrieved sample identification information to the captured identification information and determines a degree to which the sample identification information and the captured identification information match. If the degree of match is above a predetermined threshold, the IA computing device authenticates the payee. In an alternative embodiment, the IA computing device makes a web service call to an identification database and provides the captured identification information along with a request to authenticate the captured identification information. The identification database compares the captured identification information to the sample identification stored in the identification database and provides to the IA computing device with a response indicating if the payee is authenticated or not authenticated.

When the IA computing device determines that the payee has been authenticated based on the captured identification information, the payee account and the payer account are linked. For example, the payer's application displays the payee as a party to whom a payment may be paid. The IA computing device may transmit a notification to the payer and/or the payee indicating that the enrollment of the payee is complete. For example, the notification may be provided through the applications or sent directly to client devices (e.g., by SMS message).

In some embodiments, at completion of the enrollment process the payee receives a first payment from the payer associated with the payer's registering of the payee. In alternative embodiments, the enrollment process is separated from making payments. The payer makes a payment by selecting the payee using the application running on the payer's client device and inputting an amount, payment source, and/or other information.

In further alternative embodiments, the payee enrolls themselves without interaction with the payer and prior to a transaction with the payer. The payee registers with the IA computing device proactively, for example, by providing the IA computing device with identification information and captured biometric information. The IA computing device verifies the identity of the payee using the captured biometric information and an identification database as described herein. The IA computing device assigns a unique platform ID to the payee that allows payers to transact with a specific payee. The payee shares their platform ID with a payer so that the payer can link their account to the payee for subsequent transactions.

To make further payments to the payee, the payer selects the payee using the application running of the payer's client device and inputs an amount, payment source, and/or other information. The application causes the payer's client device to transmit a request for direct payment to the IA computing device, directly or through the payment processing network. The IA computing device receives the request for direct payment and provides a notification to the payee using the application running on the payee's client device. The application running on the payee's client device prompts the payee to provide identification information (e.g., a fingerprint captured by a fingerprint reader of the payee's client device). The application and the payee's client device transmit the captured identification to the IA computing device. The IA computing device compares the captured identification information to sample identification information corresponding to the payee stored in an identification database. If the IA computing device determines that the captured identification and the sample identification match, the IA computing device authenticates the payee. The IA computing device, directly or through instruction to the payment processing network, causes request for direct payment to be processed by the payment processing network. The request is transmitted to an issuer bank associated with the payer and the payment is transmitted, through the payment processing network, to a second issuer bank associated with the payee. The payee's account balance is increased, and the payer's account balance is decreased.

In some embodiments, the IA computing device transmits a notification to the payee and/or payer indicating that the direct payment has been completed. For example, the IA computing device transmits an instruction that causes a notification to be displayed through the application running on the client device of the payee and/or payer. In other embodiments, the IA computing device provides a notification to the payer and/or payee through SMS message.

Payer Enrollment Phase

In a payer enrollment phase, a payer is enrolled with the IA authentication computing device for providing direct payments to a payee. Registration includes providing identification information, payment method information, and/or other information to the IA authentication computing device and/or other computing devices for performing the direct payment services described herein. For example, the payer uses a mobile computing device (e.g., a smartphone running an application provided by the IA authentication computing device or another computing device) or other computing device (e.g., desktop or laptop computer and running a browser application or program) to provide registration information such as the identification information and payment method information. The payer inputs registration information using a user interface (e.g., provided by an application or viewed using a browser displaying a website served by the IA computing device or another server). The registration information is then transmitted to the IA computing device from the payer's computing device by network communication.

Identification information, included in the registration information, includes information identifying the payer, identifying a financial institution or service provider associated with the payer (e.g., a bank, payment card issuer, internet service provider, mobile communications provider, telecommunications provider, etc.), and/or identifying a computing device associated with the payer. For example, identifying information submitted by the payer includes a username and password, name, National Identification information (National ID), biometric information, and/or other payer identifying information. National ID information is information which identifies a person and is stored by, maintained by, generated by, or otherwise associated with a government, government agency, nation, state, province, or political subdivision. For example, National ID information may be or include one or more of a unique identifying number (e.g., a Social Security number), biometric information (e.g., information describing a fingerprint, palm veins, facial characteristics, DNA, iris, retina, etc.), behavioral biometrics (e.g., information describing a gait, voice, typing rhythm, etc.).

In one embodiment, as part of enrollment, the IA computing device makes a call to a third party identification database (i.e., national ID database or issuer database) for biometric information. The IA computing device receives the biometric information and transmits the biometric information to a user's smart device enrolled with the IA computing device. The identification information is a biometric profile of the user stored in the smart device. An application, provided by the IA authentication computing device and running on the smart device, is binded to the biometric profile and is used for authentication, as described below. Payee Registration Phase In a payee registration phase, the payer registers the payee with the IA computing device using information identifying the payee. The payer registers the payee by submitting a registration request, with or without a transaction request, to the IA computing device. The request identifies the payee by including identification information such as the payee's national ID, mobile telephone number, name, address, and/or other information. The IA computing device generates a unique registration code associated with the payee. The IA computing device transmits the unique registration code to the payee using the identification information (e.g., telephone number) submitted by the payer. For example, the IA computing device transmits the unique registration code to the payee using a push notification as described herein. The IA computing device further transmits, in the same or another transmission, data for downloading and installing the identification application described herein. Upon installing and running the identification application, the payee enters the unique registration code. The identification application prompts the payee to provide captured biometric information. The identification application also prompts the payee to provide payment method information (e.g., a bank account number, payment card number or primary account number, internet service provider account number, mobile communications provider account number, telecommunications provider account number, etc.). The IA computing device authenticates the payee using the captured biometric information as described herein. If the payee is authenticated, the payee is enrolled. If the payee is not authenticated, the payee is not enrolled.

In alternative embodiments, the payee enrolls in advance with the IA computing device. The payee enrolls with the IA computing device as described above with respect to the payer. For example, the payee provides identification information, payment method information, and/or other information to the IA authentication computing device. The payee's identity is authenticated as described herein based on captured biometric information submitted by the payee and sample biometric information maintained by an identification database. If the payee is authenticated, the payee is enrolled. If the payee is not authenticated, the payee is not enrolled.

Authentication Phase

In an authentication phase, the IA computing device authenticates the identity of a user (e.g., a payee or payer). The IA computing device authenticates the identity of the user by comparing captured biometric information of the user with sample biometric information from an identification database (i.e., the national ID database, an database maintained by an issuing bank, or a database configured to store information used by the IA computing device) as described herein. For example, the IA computing device retrieves sample biometric information associated with the user being authenticating from an identification database by making a call to the identification database. The call includes identification information associated with the user being authenticated. The IA computing device receives captured biometric information from a client device of the user as described herein.

Using the received sample biometric information and the captured biometric information, the IA computing device compares the two as described herein. For example, the biometric information is a fingerprint and the IA computing device compares the captured biometric information and the sample biometric information using one or image comparison or processing techniques. The IA computing device uses pattern-based algorithms or other image processing algorithms to compare an image associated with the captured fingerprint and an image associated with the sample fingerprint. The IA commuting device aligns the captured fingerprint with the sample fingerprint based on a central point in the one or more of the fingerprints. The IA computing device compares one or more of the type, size, and orientation of one or more of arches, whorls, and loops in the captured fingerprint to those of the sample fingerprint to determine if the captured biometric information matches the sample biometric information and/or the degree to which the captured fingerprint matches the sample fingerprint. Based on the determination, the IA computing device authenticates or refuses to authenticate the user. Once the user is authenticated, the IA computing device enrolls the user or initiates a transaction with the user.

In alternative embodiments, the IA computing device authenticates the identity of a user by providing the captured biometric information to the identification database that performs the comparison to the sample biometric information. For example, in one embodiment, the IA computing device makes a web services call to the identification database including a request for authentication along with captured biometric information and identification information of the user. The identification database and/or a server providing access to the identification database compares the captured biometric information with sample biometric information stored in the identification database. The IA computing device receives from the identification database or the identification server an indication that the user's identity is authenticating (e.g., the sample and captured biometric data match) and/or a degree to which the sample and the captured biometric data match. Based on the information from the identification database, the IA computing device determines whether or not to authenticate the user. For example, if the sample and captured biometric information match above a predetermined threshold, the IA computing device determines that the user is authenticated. Once the user is authenticated, the IA computing device enrolls the user or initiates a transaction with the user.

In some embodiments, authentication is performed via an application installed on a user's smart device, as described herein. The application is binded to a biometric profile of the user stored in the smart device. The application captures biometric information from the user, such as a fingerprint. Using the received biometric information and the biometric profile of the user stored in the smart device, the IA computing device compares the two as described herein. If the received biometric information and the biometric profile match above a predetermined threshold, the IA computing device determines that the user is authenticated. Performing authentication via the application avoids making calls to identification databases (i.e., the national database or an issuer database) for every transaction.

Transaction Phase

In a transaction phase, the IA computing device receives a request from a first user for completing a transaction with a second user. The IA computing device determines if the second user is enrolled with the IA computing device. For example, the IA computing device determines if the request includes a platform ID for the second user or determines if the name or other identification information of the second user corresponds to a platform ID stored in a database of the IA computing device. The IA computing device enrolls the second user as described above if the second user is not already enrolled with the IA computing device. In some embodiments, the IA computing device, upon determining that the second user is not enrolled, prompts the first user to provide identification information of the second user such that the second user can be enrolled as described herein (e.g., by sending a push notification to the second user for downloading an identification application and for enrolling with the IA computing device).

The request from the first user for a transaction with a second user identifies the second user (e.g., by platform ID or identification information) as described above. The request further includes transaction information for carrying out the transaction. For example, transaction information includes a payment amount, payment date, payment source, text, images, and/or other information that defines the type or parameters of the transaction (e.g., a payment, a communication, a file transfer, an exchange of information, etc.).

In response to receiving the request, the IA computing device identifies the second user based on the identification information in the request. The IA computing device authenticates the second user as described herein. For example, the IA computing device prompts the second user to enter captured biometric information. The IA computing device transmits an instruction to the client system associated with the second user as identified based on the identification information associated with the second user stored in a database of the IA computing device (e.g., an address of the client system, a phone number, platform ID, etc.). The instruction causes the identification application on the second user's client system to display a prompt requesting captured biometric information. The prompt and/or an additional prompt may display information such as an identification of the first user (e.g., the payer), transaction information (e.g., a payment amount), and/or other information. The IA computing device receives captured biometric information, a request to continue with the transaction, and/or other information from the client device of the second user. The IA computing device authenticates the second user as described herein.

After the second user is authenticated, the IA computing device facilitates the transaction and/or otherwise causes the transaction to occur. In some embodiments, the IA computing device transmits an instruction to a payment network. The instruction is formatted, based on the request from the first user, to cause the payment network the transfer funds from an account of the first user to an account of the second user. For example, the instruction to the payment network includes a payment amount, account number of the first user, account number of the second user, issuing bank identification information, and/or other information. The payment network completes the transaction as described herein. In some embodiments, the IA computing device sends an instruction to the identification application on the first and/or second user's client system formatted to cause the identification application to display a prompt indicating that the transaction has been completed.

The detailed description herein of the embodiments of the disclosure refers to the accompanying drawings. The same reference numbers in different drawings may identify the same or similar elements. Also, the detailed description herein does not limit the claims.

Described herein are computer systems such as identity authentication computing devices and user computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The detailed description herein illustrates embodiments of the disclosure by way of example and not by way of limitation. It is contemplated that the disclosure has general application to the verification of user identities and the facilitation of transactions between the users.

FIG. 1 is a schematic diagram illustrating an example multi-party payment card system 20 for enabling payment-by-card transactions along with an identity authentication (IA) computing device 112 for authenticating the identity of payees to whom a payer is transferring funds or making a payment. FIG. 1 depicts a flow of data in a typical financial transaction through system 20, which includes the IA computing device 112. IA computing device is in communication with payment network 28 to provide identity authentication prior to completion of a transfer of funds from a payer to a payee.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are customers of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or payer 22, who uses the transaction card to tender payment for a purchase from a merchant 24. Payer 22 may purchase goods and services ("products") at merchant 24. Payer 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When payer 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads payer's 22 account information from a magnetic stripe, a chip, or embossed characters on the transaction card and communicates electronically with the transaction processing computers of merchant bank 26. Merchant 24 receives payer's 22 account information as provided by payer 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor." In further embodiments, payer 22 makes a transfer or payment to a payee 34 rather than merchant 24. The process occurs as described herein and in a similar or same manner as a payment to merchant 24.

Using an interchange network 28, computers of merchant bank 26 or merchant processor will communicate with computers of an issuer bank 30 to determine whether payer's 22 account 32 is in good standing and whether the purchase is covered by payer's 22 available credit line. Based on these determinations, the request for authorization will be declined or accepted. If the request is accepted, an authorization code is issued to merchant 24. In some embodiments, IA computing device 112 uses interchange network 28 to communicate with computers of issuer bank 30 to determine whether payer's 22 account 32 is in good standing and whether the purchase is covered by payer's 22 available credit line.

When a request for authorization is accepted, the available credit line of payer's 22 account 32 is decreased. Normally, a charge for a payment card transaction is not posted immediately to payer's 22 account 32 because bankcard networks, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If payer 22 cancels a transaction before it is captured, a "void" is generated. If payer 22 returns products after the transaction has been captured, a "credit" is generated. Interchange network 28 and/or issuer bank 30 stores the transaction card information and/or transaction information such as a type of merchant, amount of purchase, date of purchase, and/or other information in a database 120 (shown in FIG. 2).

After a purchase has been made or a payment has been made, a clearing process occurs to transfer additional transaction data related to the purchase among the parties to the transaction, such as merchant bank 26, interchange network 28, issuer bank 30, and a second issuer bank 36 at which payee 34 has a payee account 38. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including IA computing device 112. In the example embodiment, interchange network 28 provides such transaction data and additional transaction data to IA computing device 112. In alternative embodiments, any party may provide such data to IA computing device 112.

After a transaction is authorized and cleared, the transaction is settled among merchant 24, merchant bank 26, and issuer bank 30. In some embodiments, the transaction is settled among payee 34, second issuer 36, and issuer bank 30. Settlement refers to the transfer of financial data or funds among merchant's 24 account, merchant bank 26, and issuer bank 30 related to the transaction. Settlement also refers to the transfer of financial data or funds among payee account 38, second issuer 36, and issuer bank 30. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In some embodiments, payer 22 and/or a payee 34 are not cardholders or otherwise do not have payment cards. Additionally or alternatively, payer 22 may desire to transfer funds to payee 34 but payee 34 lacks access to a point of sale terminal or other device capable of processing a transaction card. In such a case, payer 22 transfers funds to payee 34 directly without the use of transaction cards. Payer 22 submits a request for direct payment to payee 34 using a computing device such as a mobile phone. The request for direct payment to payee 34 is received by payment network 28 (e.g., through network communication, via the internet or a cellular network, with the computing device used by payer 22). IA computing device 112 is in communication with payment network 28 and receives the request for direct payment from payment network 28. In alternative embodiments, IA computing device 112 receives the request for direct payment directly from a computing device associated with payer 22. For example, IA computing device 112 receives the request for direct payment through network communications with the computing device associated with payer 22. The network communication occurs through, for example, the internet, a cellular data network (e.g., a Global System for Mobile Communications (GSM) network, a Code Division Multiple Access (CDMA) network, a Universal Mobile Telecommunications System (UMTS) network, a High Speed Packet Access (HSPA) network, a 3G network, a 4G network, a Long-Term Evolution (LTE) network, etc.), and/or other electronic communications network.

Upon receiving the request for direct payment, IA computing device 112 in communication with payment network 28 authenticates the identity of payee 34 using the systems and methods described herein. For example, IA computing device 112 uses identifying information, such as a payee 34 phone number in the request for direct payment, to send a unique registration code and application download link to a computing device associated with payee 34 (e.g., a phone). Using the application, payee 34 submits identification information (e.g., captured biometric information such as a fingerprint, retinal image, etc. or other identification information such as a Social Security number or other identification number) to IA computing device 112. In some embodiments, the identification information is national identification information provided, recorded, managed, or otherwise associated with a government or government agency. IA computing device 112 confirms the identity of payee 34 by comparing the captured identification information, submitted through payee's 34 computing device, to sample identification information. Upon confirmation of payee's 34 identity, IA computing device 112 and payment network 28 submit the transaction to issuer 30. Issuer 30 is a bank or other institution (e.g., a telecommunication provider) associated with payer 22 (e.g., at which payee 22 has a line of credit, account, savings account, entity from which payer 22 receives bills, etc.). Issuer 30 determines whether payer's 22 account 32 is in good standing and whether the payment is covered by payer's 22 available credit line. Based on these determinations, the request for authorization will be declined or accepted.

When a request for authorization is accepted, the available credit line of payer's 22 account 32 is decreased. Funds are transferred payer's 22 account 32 at issuer 30 to second issuer 36 associated with payee 34 through payment network 28. Second issuer 36 credits payee's 34 account 38 or otherwise provides payee 34 with the funds. In alternative embodiments, payee 34 and payer 22 have accounts at the same issuer 30. In this case, issuer 30 decreases payer's 22 account 32 and increases payee's 34 account 38. The transfer may occur without network 28. For example, payer 22 submits a request for a direct payment to payee 34 through network 28 and/or the internet, a cellular network, or other electronic communications network. IA computing device 112 authenticates payee's 34 identity as described herein and the request for a direct payment to payee 34 is provided to payer's 22 issuer 30. Issuer 30 is also payee's 34 issuer 30. Issuer 30 decreases the available line of credit or funds of payer's 22 account or bills payer's 22 account and increases the available line of credit or funds of payee's 34 account or credits a bill or payee's 34 account.

In some embodiments, after the payment has been made, a clearing process occurs to transfer additional transaction data related to the purchase among the parties to the transaction and/or other parties, such as, interchange network 28, IA computing device 112, issuer bank 30, second issuer 36, payer 22, payee 34, merchant bank 26, and/or other parties. More specifically, during and/or after the clearing process, additional data, such as a time of purchase, a merchant name, a type of merchant, purchase information, account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including IA computing device 112. In the example embodiment, interchange network 28 provides such transaction data and additional transaction data to IA computing device 112. In alternative embodiments, any party may provide such data to IA computing device 112.

Figure 2:
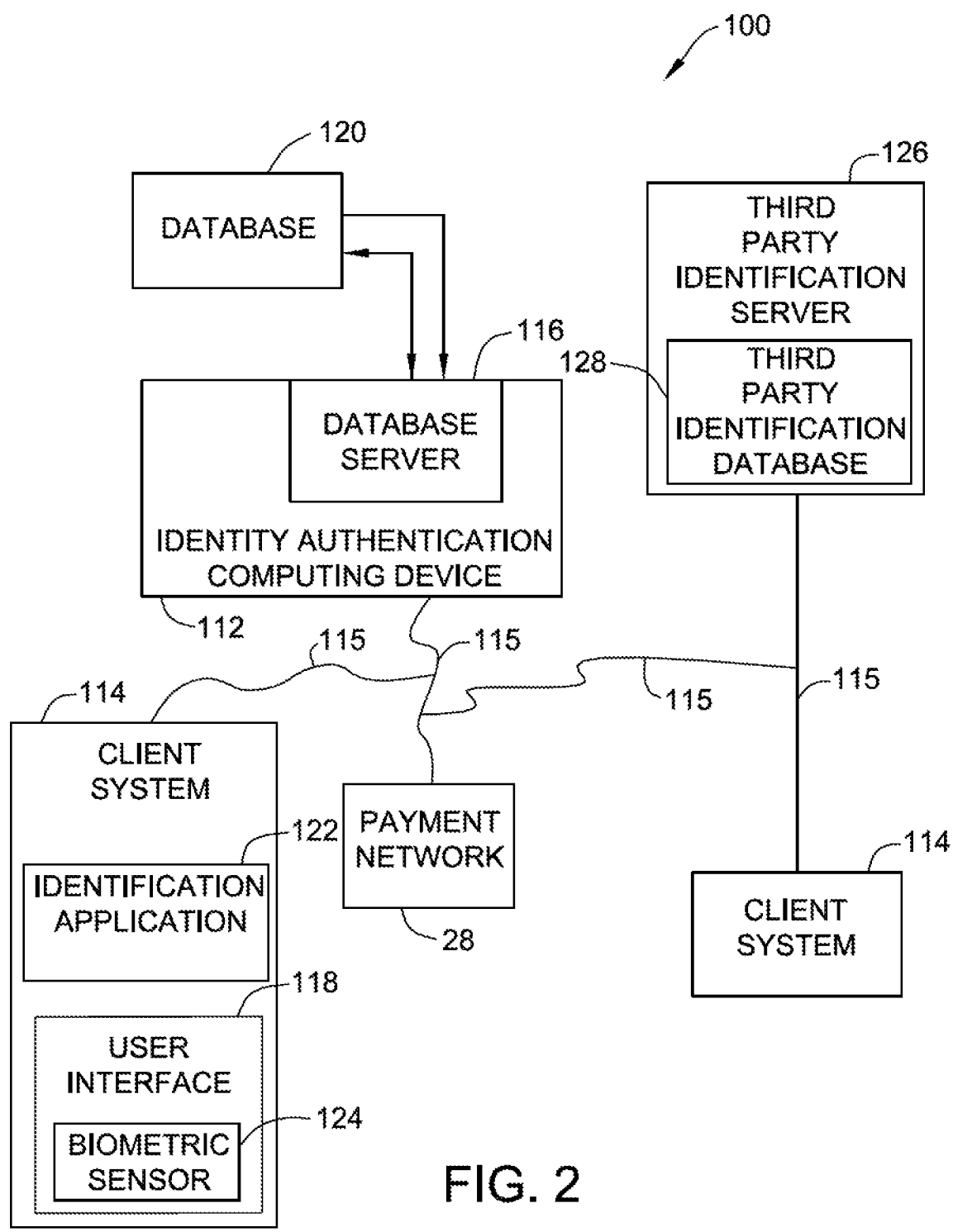

FIG. 2 is an expanded block diagram of an example embodiment of an identity authentication and transaction platform 100 used in authenticating user identities and processing transactions that includes IA (identity authentication) computing device 112 in accordance with one example embodiment of the present disclosure. In the example embodiment, platform 100 is used for facilitating transactions between users and for authenticating user identities as described herein.

More specifically, in the example embodiment, platform 100 includes an IA computing device 112, and a plurality of client sub-systems, also referred to as client systems 114, connected to IA computing device 112. In one embodiment, client systems 114 are computers including a web browser, such that IA computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1). IA computing device 112 is also in communication with interchange network 28 using network 115. Further, client systems 114 may additionally communicate with interchange using network 115. Client systems 114 could be any device capable of interconnecting to the Internet including a web-based phone (e.g., smartphone), PDA, or other web-based connectable equipment.

A database server 116 is connected to database 120, which contains information on a variety of matters, as described below in greater detail. In alternative embodiments, centralized database 120 is stored on IA computing device 112. Database 120 may be a database configured to store information used by IA computing device 112 including, for example, transaction data, data for implementing an authentication application on a client device, user data such as a platform ID and identification information of a user (e.g., a name, address, account identifier, etc.), a database of user login information, and/or other data. In some embodiments, database 120 further includes biometric identification information for potential users for use in strong authentication. For example, database 120 may store identifying information such as name, address, national ID number, age, gender, mobile phone number, biometric identification information (e.g., fingerprints, palm vein pattern, facial recognition pattern, iris pattern, retina pattern, a voice pattern, typing rhythm, or other human and/or behavioral characteristic unique to individuals.

In the example embodiment, one of client systems 114 is associated with a first user, payer 22. A second client system 114 is associated with a second user, payee 34. In the example embodiment, client systems 114 include a user interface 118. For example, user interface 118 may include a graphical user interface with interactive functionality, such that a user can provide captured biometric information to IA computing device 112, enroll with IA computing device 112, and/or provide IA computing device 112 an instruction for making a payment to another user. Client systems 114 include a biometric sensor 124. For example, biometric sensor 124 is a fingerprint sensor, camera, or other sensor included in silent system 114 (e.g., integrated within a smartphone). In alternative embodiments, biometric sensor 124 is not integrated with client system 114 but is in wired or wireless communication with client system 114. IA computing device 112 may be associated with interchange network 28 and/or may process transaction data. For example, IA computing device 112, after authenticating the identity of payee 34, transmits an instruction to payment network 28 that causes a payment to be made from payer 22 to payee 34.

In some embodiments, IA computing device 112 further includes an identification application 122. Identification application 122 runs on client system 114 (e.g., is executed by a processor and memory included in client system 114). Identification application 122 provides for the functions of client system 114 described herein. Identification application 122 provides a graphical user interface for a first user (e.g., payer 22) to initiate a transaction (e.g., a payment) with a second user (e.g., payee 34). For example, the first user can select from a list of users enrolled with IA computing device 112, search for a second user using identification information, or provide identification information of the second user to initiate the enrollment procedure described herein where the second user receives a push notification to download the identification application 122. Identification application 122 allows the second user to verify their identity by submitting biometric information using biometric sensor 124. Identification application 122 causes client system 114 to transmit the captured biometric information to IA computing device 112 through network 115. Identification application 122 also provides for communication between users and IA computing device 112. For example, Identification application 122 displays prompts as described herein.

In one embodiment, a third party identification server 126 is in communication with IA computing device 112 through network 115. Third party identification server 126 maintains and provides access to third party identification database 128. Third party identification server 126 and/or third party identification database 128 are maintained by a government, an issuer, or other agency. Third party identification database 128 is an identification database of sample biometric identification information of the type described herein. In some embodiments, IA computing device 112 requests sample biometric information from third party identification server 126 to authenticate a user who has supplied captured biometric information through network 115. For example, IA computing device 112 transmits a request over network 115 to third party identification server 126 that includes identification information of a user to be authenticated. The identification information includes, for example, a user's name, address, telephone number, and/or other information. Third party identification server 126 receives the request including the identification information and returns, through network 115 and to IA computing device 112, sample biometric information associated with the user identified by the identification information.

In alternative embodiments, IA computing device 112 retrieves sample biometric information and associated identification information from third party identification server 126 for a variety of user or potential users and stores the retrieved sample biometric information in database 120. In further alternative embodiments, IA computing device 112 transmits requests for authentication to third party identification server 126. The request includes captured biometric information and identification information of a user. Third party identification server 126 determines if there is a match between the captured biometric information and sample biometric information stored in third party identification database 128. Third party identification server 126 transmits the results to IA computing device 112. IA computing device 112 authorizes users and/or facilitates transactions as described herein based on the sample biometric information.

Figure 3:
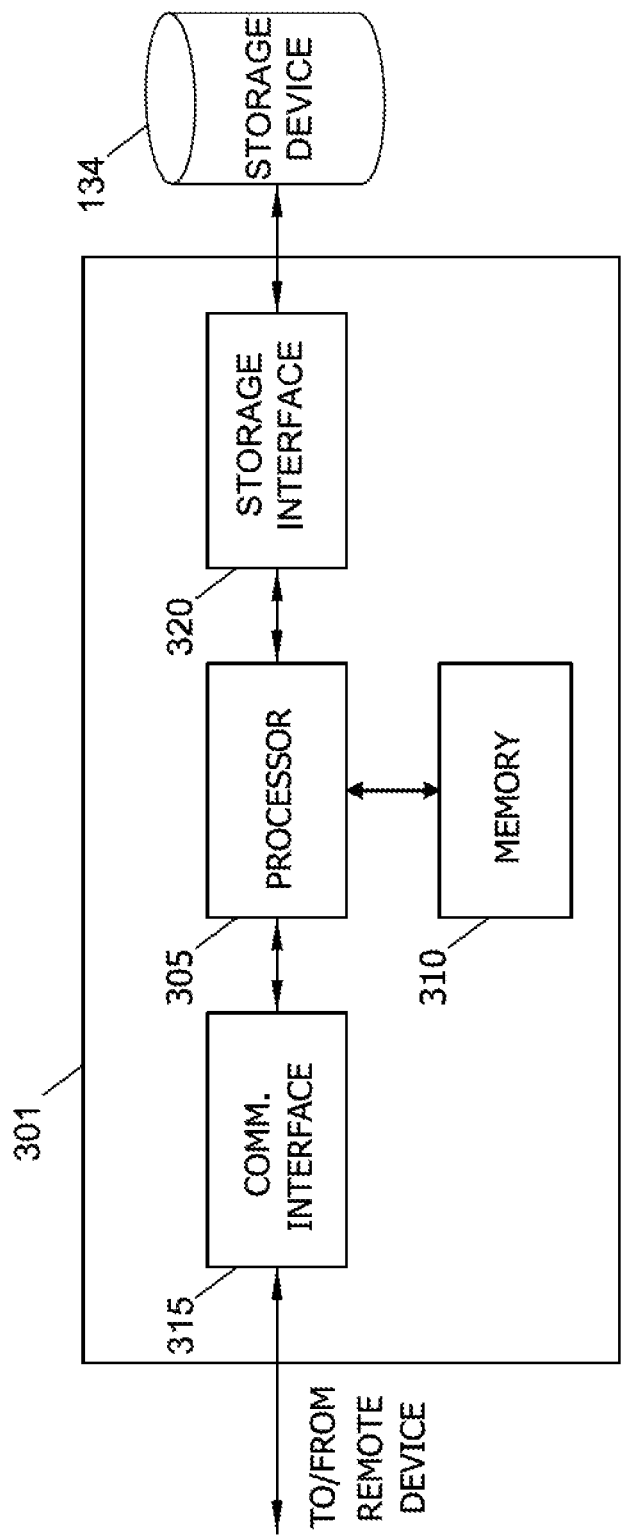

FIG. 3 illustrates an example configuration of a server (host computing device) system 301 such as IA computing device 112 (shown in FIG. 2) used to authenticate users, facilitate transactions between users, and/or otherwise perform the functions described herein in accordance with one example embodiment of the present disclosure.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests (e.g., to perform a transaction) from a client system 114 via the Internet, as illustrated in FIG. 2. Communication interface 315 may also transmit prompts such as those described herein to client system 114 via the Internet.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system. In some embodiments, server system 301 also includes database server 116.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
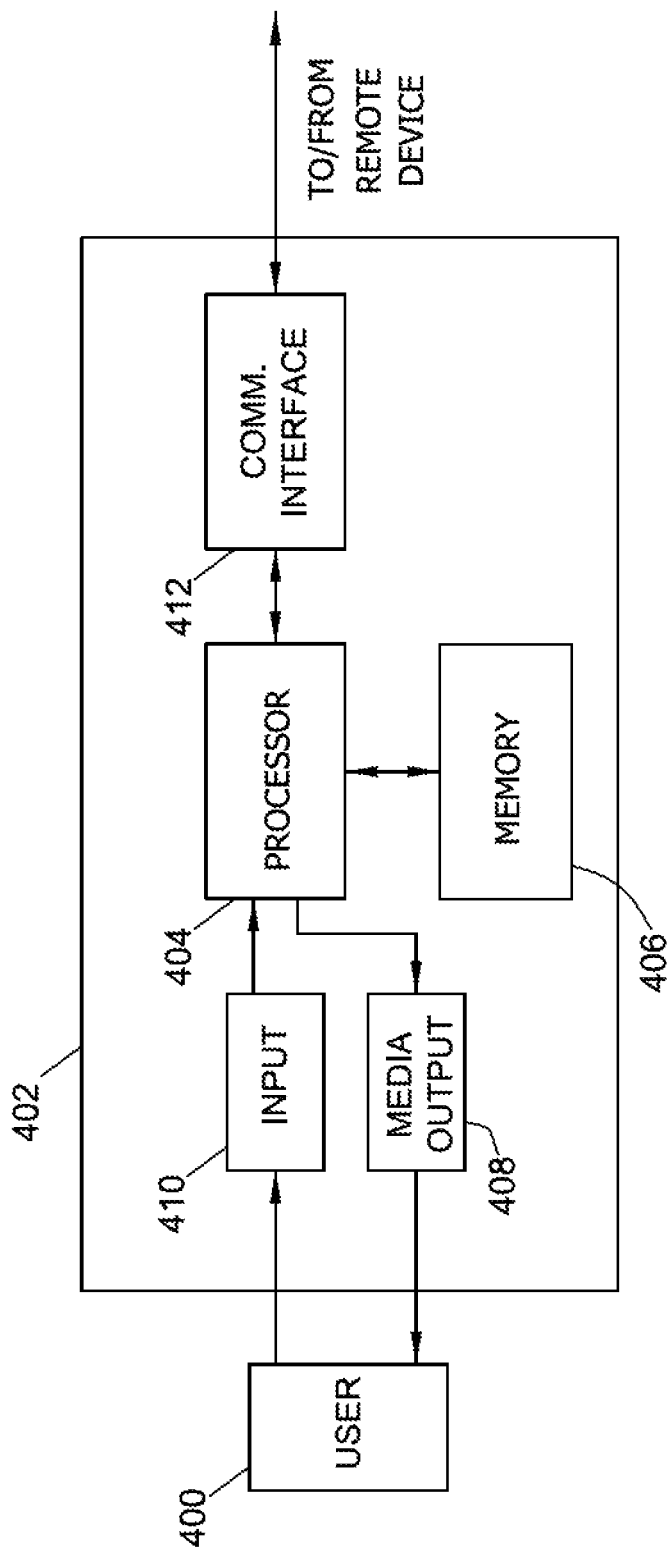

FIG. 4 illustrates an example configuration of a client computing device 402. Client computing device 402 may include, but is not limited to, client systems ("client computing devices") 114. Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400 (e.g., a payer 22). Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410. In some embodiments, input device 410 is or includes a fingerprint reader or other biometric sensor.

Client computing device 402 may also include a communication interface 412, which is communicatively couplable to a remote device such as server system 301 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 406 are, for example, computer-readable instructions for providing a user interface to user 400 via media output component 408 and, optionally, receiving and processing input from input device 410. A user interface may include, among other possibilities, a web browser and client application. Web browsers enable users 400 to display and interact with media and other information typically embedded on a web page or a website from a web server associated with a merchant. A client application allows users 400 to interact with a server application associated with, for example, a merchant. The user interface, via one or both of a web browser and identification application 122, facilitates user authentication and transactions between users using IA computing device 112. The user may interact with the user interface to instruct IA computing device 112 to perform a transaction between users, to enroll with IA computing device 112, to provide captured biometric information to IA computing device 112, and/or otherwise perform the functions described herein.

Figure 5A:
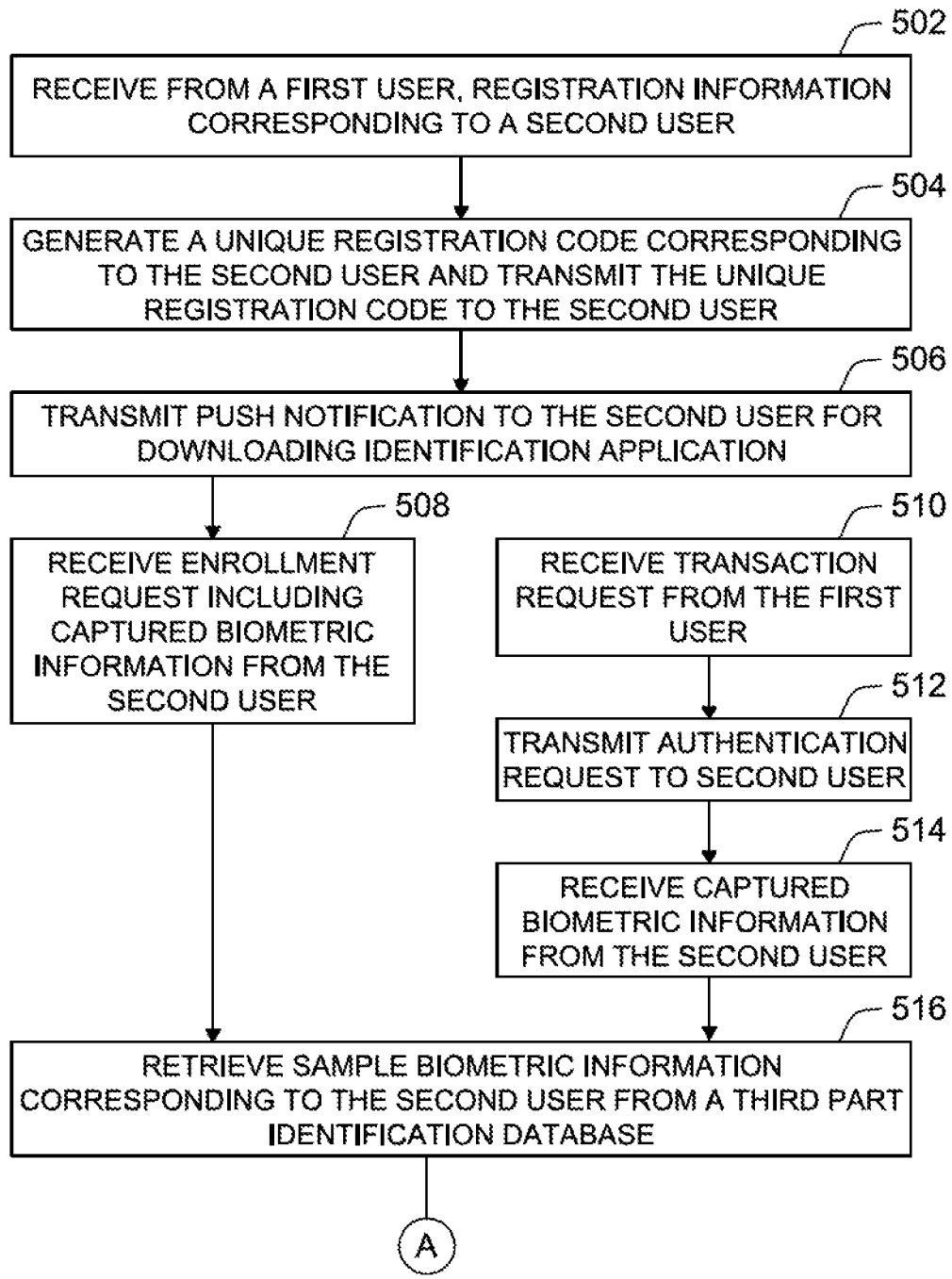
FIGS. 5A and 5B are a simplified data flow diagram for authenticating a user identity using the identity authentication computing device of FIG. 2.
Figure 5B:
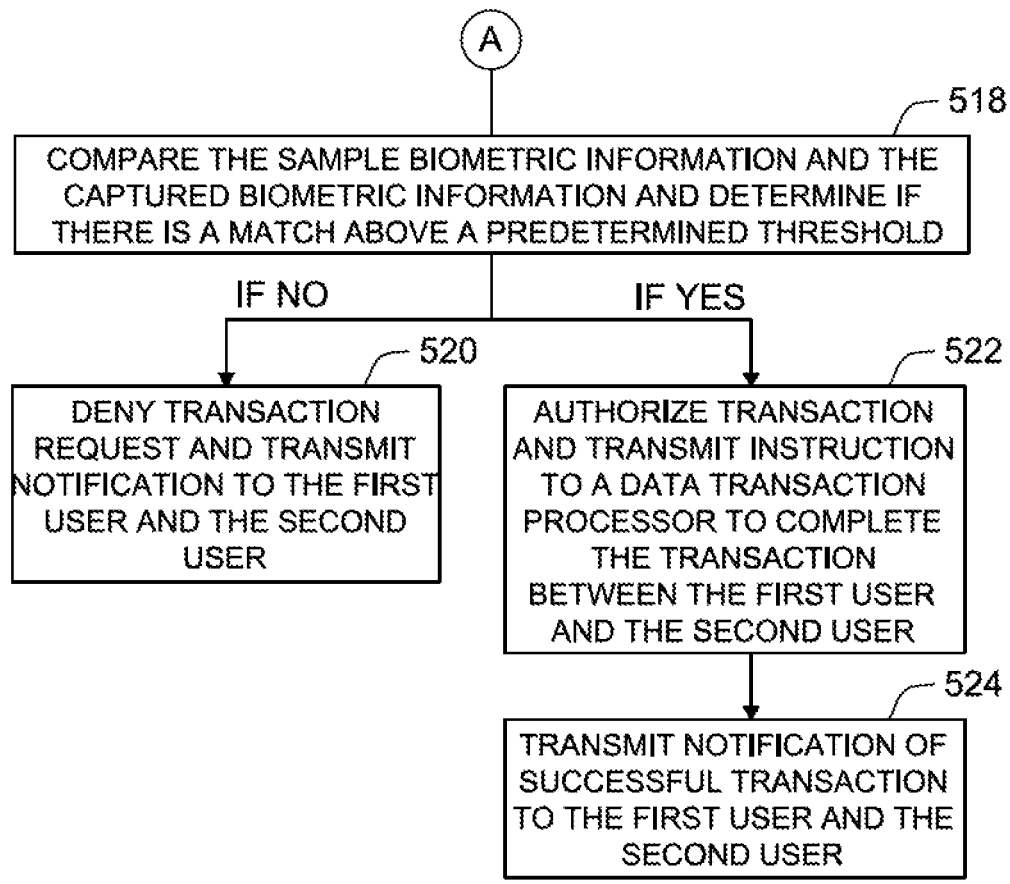

FIGS. 5A and 5B are a simplified diagram of an example method 500 for authenticating user identities. Specifically, IA computing device 112 receives 502, from a first user, registration information corresponding to a second user. The registration information includes at least non-biometric identification information (e.g., a name, an address, a national identification number, etc.) and contact information (e.g., a mobile telephone number, an e-mail address, a social media account user name, etc.). The registration information is received from a client device used by the first user. In response to receiving the registration information, IA computing device 112 generates 504 a unique registration code corresponding to the second user and transmits the unique registration code to the second user. For example, the unique registration code is an alphanumeric code. The IA computing device 112 transmits the unique registration code to a client device of the second user. For example, the IA computing device 112 transmits an e-mail, Short Message Service (SMS) message, or other electronic message that includes the unique registration code to the client device of the second user using the contact information (e.g., phone number) of the second user. IA computing device 112 further transmits 506 a push notification to the second user for downloading the identification application to the client device of the second user. For example, IA computing device 112 transmits an e-mail, SMS, or other electronic message that includes a link to download and/or install the identification application (e.g., a hypertext mark-up language hyperlink), executable instruction configured to install the identification application, or other information for acquiring the identification application.

IA computing device 112 receives 508 an enrollment request, including captured biometric information, from the second user transmitted by a client device running the identification application. For example, the identification application prompts the second user to input biometric information captured by the client device. The client device and the identification application transmit the captured biometric identification to IA computing device 112 that receives the information along with the enrollment request. IA computing device 112 enrolls the second user for future transactions upon determining that the captured biometric information matches sample biometric information for the second user as described herein.

IA computing device 112, when not enrolling the second user as described herein, receives 510 a transaction request from the first user. For example, the first user transmits a transaction request to IA computing device 112 from a client device using an identification application or other application running thereon. In response, IA computing device 112 transmits 512 an authorization request to the second user (e.g., to a client device of the second user based on the contact information associated with the second user). The authorization request causes the identification application running on the user device of the second user to prompt the second user to input biometric identification information that is transmitted to IA computing device 112. IA computing device 112 receives 514 the captured biometric information from the second user.

In both the enrollment process and transaction process, IA computing device 112 retrieves sample biometric information corresponding to the second user from an identification database. In some embodiments, the identification database is a database maintained by a government or government agency that includes identity information forming a portion of a national identification system. For example, the identification database is a database including identification information such as name, address, biometric information (e.g., a fingerprint), telephone number, a national identification number, and/or other identifying information. An example of such is the database of unique identity numbers, names, and biometric information maintained by the Unique Identification Authority of India. In some embodiments, IA computing device 112 retrieves sample biometric information by making a call to the identification database. For example, in one embodiment, IA computing device 112 makes a web services call using an Extensible Markup Language Remote Procedure Call (XML-RPC). In the web services call, IA computing device 112 includes identification information of the second user such as a name, address, government issued identification number (e.g., a social security number), and/or other information. The identification database and/or a server handling web service calls uses the identification information to identify corresponding biometric information stored in the identification database.

IA computing device 112 compares 518 the sample biometric information and the captured biometric information and determines if there is a match above a predetermined threshold. For example, IA computing device 112 uses pattern-based algorithms or other image processing algorithms to compare an image associated with the captured biometric information including a fingerprint and an image associated with the sample biometric information including a fingerprint. The comparison may yield a match percentage, other indicator of the degree to which the biometric information matches, or a probability that the sample and captured biometric information match. Based on this information, IA computing device 112 determines if there is a match between the sample and captured biometric information above a predetermined threshold value.

In response to a determination that there is not a match, IA computing device 112 denies 520 the transaction request or enrollment request. IA computing device 112 may also transmit a notification to the second user and/or the first user indicating that the transaction request or enrollment request has been denied. For example, IA computing device 112 transmits an instruction to a client device that causes the identification application running thereon to display the notification.

In response to a determination that there is a match, IA computing device 112 authorizes 522 the transaction request or enrollment request. For example, IA computing device 112 enrolls the second user. Enrollment may include, for example, storing identification information for the second user such as a name, phone number, user name, or other identification information. Further information that is stored by IA computing device 112 may include transaction information for facilitating transactions including the second user. Transaction information includes, for example, an account number, routing number, or other information identifying an account at an issuing bank, e.g., second issuer 36. That enables the second user to receive payments and/or make payments via IA computing device 112, the identification application, and/or payment network 28.

IA computing device 112 authorizes transaction requests by, for example, transmitting an instruction for conducting a transaction to payment network 28. The instruction includes information such as identification information of the first user and the second user and/or transaction information associated with the first user and the second user. The transaction information includes an account number associated with the second user at second issuer 36 and an account number associated with the first user at issuer 30. For example, the transaction information may include a PAN associated with a payment card of the first user and/or the second user. The transaction information further includes an amount of a payment to transfer from the first user, e.g., payer account 32 at issuer 30, to the second user, e.g., payee account 38 at second issuer 36. Payment network 28 receives the instruction and processes the payment, e.g., causing payee account 38 to be increased by the amount of the payment and payer account 32 to be decreased by the amount of the payment.

In some embodiments, IA computing device 112 transmits 524 a notification of a successful transaction to the first user and/or the second user. For example, IA computing device 112 transmits an instruction to the client device of the first user and/or the client device of the second user that is formatted to cause the identification application running thereon to display a prompt. The prompt may indicate that the second user has been enrolled with IA computing device 112 or that a transaction has been completed.

Figure 6:
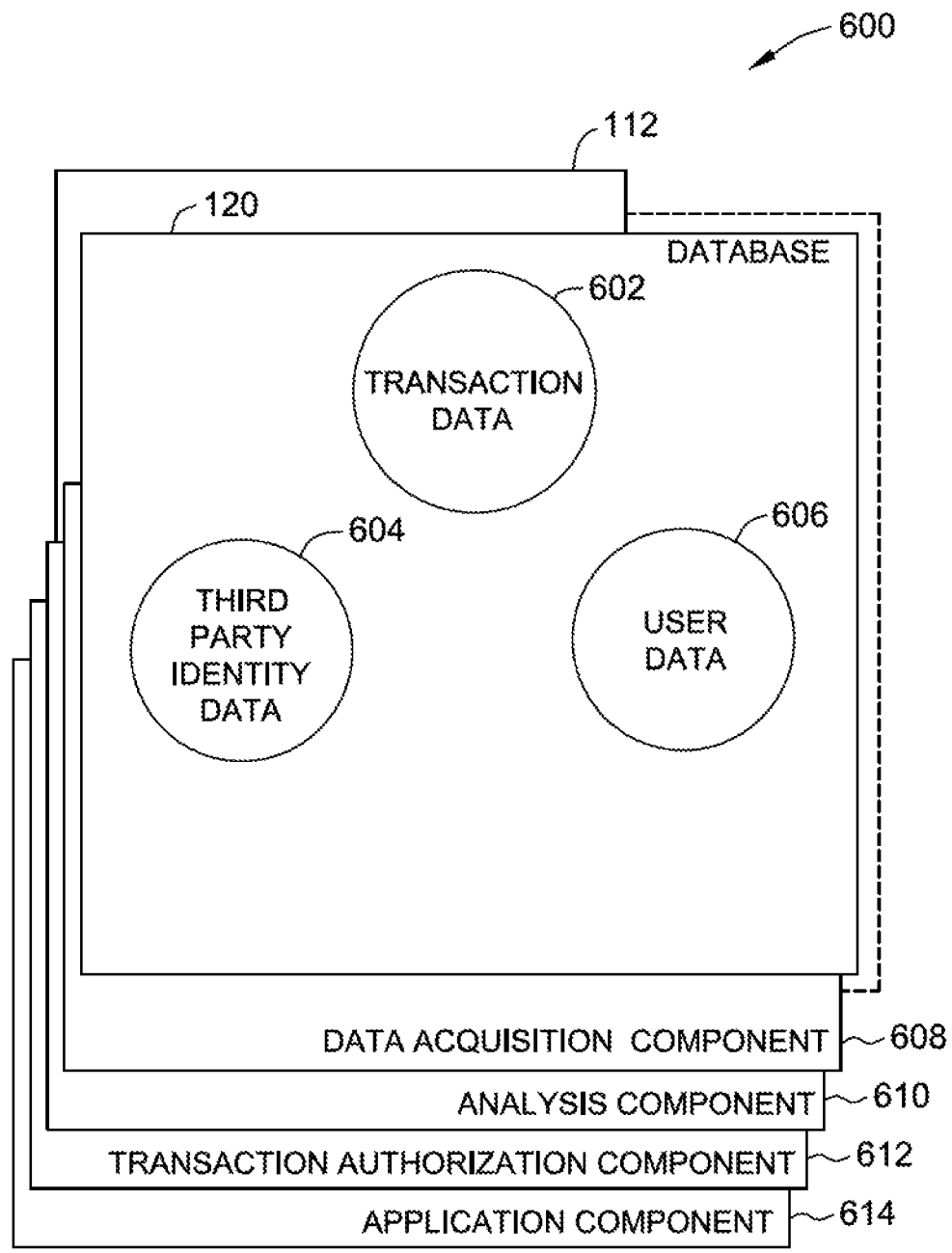

FIG. 6 is a diagram of components of one or more example computing devices that may be used in the environment shown in FIG. 2. FIG. 6 further shows a configuration of databases including at least database 120 (shown in FIG. 2). Database 120 may store information such as, for example, transaction data 602, identity data 604, and user data 606. Database 120 is coupled to several separate components within IA computing device 112, which perform specific tasks.

IA computing device 112 includes a data acquisition component 608 for acquiring captured biometric information from a second user and acquiring identity data 604 (e.g., sample biometric information) from third party identification server 126 and/or database 120. IA computing device 112 further includes an analysis component 610 for comparing captured biometric information and sample biometric information of a user. Analysis component 610 performs the analysis described herein and determines if and/or to what degree the captured biometric information and the sample biometric information match. IA computing device 112 further includes a transaction authorization component 612. Transaction authorization component 612 authorizes and facilitates transactions between users based on the results from analysis component 610. For example, transaction authorization component determines if the match between the captured and sample biometric information is above a predetermined threshold. In response, transaction authorization component 612 transmits an instruction to or using payment network 28 to make a payment from payer 22 to payee 34. IA computing device 112 further includes an application component 614. Application component 614 transmits identification application 122 and/or data for installing identification application 122 to client systems 114 as described herein (e.g., as part of the enrollment process initiated by payer 22). Application component 614 also communicates with identification applications 122 using network 115 to perform the functions described herein such as displaying prompts on client systems 114.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

In addition, although various elements of the identity authenticating computing device are described herein as including general processing and memory devices, it should be understood that the merchant analytics computing device is a specialized computer configured to perform the steps described herein for generating and displaying aggregated merchant analytics for a sector, as well as identifying an impact event using the aggregated merchant analytics.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of authorizing a data transaction between a first user and a second user by authenticating a user identity of the second user, the method implemented using an identity authentication computing device in connection with a memory and a data transaction processor, said method comprising:

receiving, by the identity authentication computing device and from a first client device, a request from the first user for a data transaction with the second user, wherein the first user is registered with the identity authentication computing device, and wherein the request includes identification information of the second user;

enrolling, by the identity authentication computing device, based on the request, the second user with the identity authentication computing device by:

generating, by the identity authentication computing device, a unique registration code to enable the second user to register with the identity authentication computing device;

transmitting, by the identity authentication computing device to a second client device associated with the second user, the unique registration code and computer-implementable instructions, wherein when executed by the second client device, the computer-implementable instructions cause the second client device to download and install an application for capturing biometric identification information; and receiving, from the second user, via the application, a user input of the unique registration code during enrollment;

transmitting, by the identity authentication computing device and to the second client device, in response to receiving the unique registration code from the second user during enrollment, instructions formatted to i) cause the second client device to prompt the second user to position the second user's body with respect to a biometric capture device of the second client device, and ii) control the biometric capture device to capture biometric identification information of the second user;

receiving, by the identity authentication computing device and from the second client device, captured biometric identification information corresponding to the second user;

retrieving, by the identity authentication computing device, from a national identification database of sample biometric identification information in network communication with the identity authentication computing device, sample biometric identification information associated with the second user, wherein the national identification database is unaffiliated with the identity authentication computing device;

comparing the captured biometric information from the second client device to the sample biometric information retrieved from the national identification database;

authenticating the user identity of the second user by determining, based on the comparison, that that the captured biometric information and the sample biometric information match to a degree above a predetermined threshold;

transmitting, by the identity authentication computing device, in response to authenticating the user identity of the second user, an instruction to the data transaction processor to complete the data transaction between the first user and the second user; and transmitting, by the identity authentication computing device, to at least one of the first client device and the second client device, instructions formatted to cause a notification to be displayed that indicates the data transaction has been completed.

2. The method of claim 1, further comprising linking, by the identity authentication computing device, an account of the first user with an account of the second user in response to authenticating the user identity of the second user.

3. The method of claim 1, wherein biometric identification information includes a fingerprint, and wherein the national identification database includes sample biometric identification information maintained by a government.

4. The method of claim 1, wherein comparing the captured biometric information and the sample biometric information comprises comparing, by the identity authentication computing device, the captured biometric information and the sample biometric information using an image comparison.

5. The method of claim 1, wherein comparing the captured biometric information and the sample biometric information comprises:

transmitting, by the identity authentication computing device, the captured biometric information and a request for validation to a system configured to maintain the national identification database; and receiving, by the identity authentication computing device and from the system, an indication of the degree to which the captured biometric information and the sample biometric information match.

6. The method of claim 1, wherein the data transaction processor is a payment processing network, wherein the first user is a payer, wherein the second user is a payee, and wherein the data transaction between the first user and the second user comprises a payment from the first user to the second user.

7. An identity authentication computing device comprising at least one processor in communication with a memory, said identity authentication computing device in communication with at least a first client device and a second client device, said at least one processor programmed to:

receive, from the first client device, a request from a first user for a data transaction with a second user, wherein the first user is registered with the identity authentication computing device, and wherein the request includes identification information of the second user;

enroll the second user with the identity authentication computing device by:

generating a unique registration code to enable the second user to register with the identity authentication computing device;

transmitting, to a second client device associated with the second user, the unique registration code and computer-implementable instructions, wherein when executed by the second client device, the computer-implementable instructions cause the second client device to download and install an application for capturing biometric identification information; and receiving, from the second user, via the application, a user input of the unique registration code during enrollment;

transmit, to the second client device, in response to receiving the unique registration code from the second user during enrollment, instructions formatted to cause the second client device to prompt the second user to position the second user's body with respect to a biometric capture device of the second client device, and ii) control the biometric capture device to capture biometric identification information of the second user;

receive, from the second client device, captured biometric identification information corresponding to the second user;

retrieve, from a national identification database of sample biometric identification information in network communication with the identity authentication computing device, sample biometric identification information associated with the second user wherein the national identification database is unaffiliated with the identity authentication computing device;

compare the captured biometric information from the second client device to the sample biometric information retrieved from the national identification database;

authenticate the user identity of the second user by determining, based on the comparison, that the captured biometric information and the sample biometric information match to a degree above a predetermined threshold and in response:

transmit, in response to authenticating the user identity of the second user, an instruction to a data transaction processor to complete the data transaction between the first client device and the second client device; and transmit, at least one of the first client device and the second client device, instructions formatted to cause a notification to be displayed that indicates the data transaction has been completed.

8. The identity authentication computing device of claim 7, wherein said at least one processor is further programmed to link an account of the first user with an account of the second user in response to authenticating the user identity of the second user.

9. The identity authentication computing device of claim 7, wherein the biometric identification information includes a fingerprint, and wherein the national identification database includes sample biometric identification information maintained by a government.

10. The identity authentication computing device of claim 7, wherein said at least one processor is further programmed to compare the captured biometric information and the sample biometric information by using an image comparison.

11. The identity authentication computing device of claim 7, wherein said at least one processor is further programmed to compare the captured biometric information to the sample biometric information by:

transmitting the captured biometric information and a request for authentication to a system configured to maintain the national identification database; and receiving, from the system, an indication of the degree to which the captured biometric information and the sample biometric information match.

12. The identity authentication computing device of claim 7, wherein the data transaction processor is a payment processing network, wherein the first user is a payer, wherein the second user is a payee, and wherein the data transaction between the first user and the second user comprises a payment from the first user to the second user.

13. A non-transitory computer-readable storage media having computer-executable instructions embodied thereon, wherein when executed by an identity authentication computing device including at least one processor in communication with a memory, the computer-executable instructions cause the identity authentication computing device to:

receive, from a first client device, a request from a first user for a data transaction with a second user, wherein the first user is registered with the identity authentication computing device, and wherein the request includes identification information of the second user;
enroll the second user with the identity authentication computing device by:
  generating a unique registration code to enable the second user to register with the identity authentication computing device;
  transmitting, to a second client device associated with the second user, the unique registration code and computer-implementable instructions, wherein when executed by the second client device, the computer-implementable instructions cause the second client device to download and install an application for capturing biometric identification information; and
  receiving, from the second user, via the application, a user input of the unique registration code during enrollment
transmit, to a second client device, in response to receiving the unique registration code from the second user, instructions formatted to cause the second client device to prompt the second user to position the second user's body with respect to a biometric capture device of the second client device, and ii) control the biometric capture device to capture biometric identification information of the second user;
receive, from the second client device, captured biometric identification information corresponding to the second user;
retrieve, from a national identification database of sample biometric identification information in network communication with the identity authentication computing device, sample biometric identification information associated with the second user wherein the national identification database is unaffiliated with the identity authentication computing device;
compare the captured biometric information from the second client device to the sample biometric information retrieved from the national identification database;
authenticate the user identity of the second user by determining, based on the comparison, that the captured biometric information and the sample biometric information match to a degree above a predetermined threshold;
transmit, in response to authenticating the user identity of the second user, an instruction to a data transaction processor to complete the data transaction between the first client device and the second client device; and
transmit, to at least one of the first client device and the second client device, instructions formatted to cause a notification to be displayed that indicates the data transaction has been completed.

14. The non-transitory computer-readable storage media in accordance with claim 13, wherein the computer-executable instructions cause the processor to link an account of the first user with an account of the second user in response to authenticating the user identity of the second user.

15. The non-transitory computer-readable storage media in accordance with claim 13, wherein the biometric identification information is a fingerprint, and wherein the national identification database includes sample biometric identification information maintained by a government.

16. The non-transitory computer-readable storage media in accordance with claim 13, wherein the computer-executable instructions cause the processor to compare the captured biometric information and the sample biometric information by using an image comparison.

17. The identity authentication computing device of claim 7, wherein the second user is enrolled with the national identification database, and wherein prior to enrollment of the second user with the identity authentication computing device, the second user is unaffiliated with the identity authentication computing device.

* * * * *